United States Patent
Ji et al.

(10) Patent No.: US 9,066,261 B2
(45) Date of Patent: Jun. 23, 2015

(54) METHODS AND APPARATUS FOR MANAGING RADIO MEASUREMENTS DURING DISCONTINUOUS RECEPTION

(71) Applicant: Apple Inc., Cupertino, CA (US)

(72) Inventors: Zhu Ji, San Diego, CA (US); Jason Shi, Pleasanton, CA (US); Johnson Sebeni, Fremont, CA (US); Navid Damji, Cupertino, CA (US); Li Su, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 13/627,936

(22) Filed: Sep. 26, 2012

(65) Prior Publication Data

US 2013/0279353 A1 Oct. 24, 2013

Related U.S. Application Data

(60) Provisional application No. 61/585,209, filed on Jan. 10, 2012.

(51) Int. Cl.
*H04W 24/10* (2009.01)
*H04W 52/02* (2009.01)
*H04B 17/309* (2015.01)

(52) U.S. Cl.
CPC .......... *H04W 24/10* (2013.01); *H04W 52/0216* (2013.01); *H04W 52/02* (2013.01); *Y02B 60/50* (2013.01); *H04B 17/309* (2015.01)

(58) Field of Classification Search
None
See application file for complete search history.

(56) References Cited

U.S. PATENT DOCUMENTS

| 2009/0092056 | A1 | 4/2009 | Kitazoe | |
|---|---|---|---|---|
| 2010/0130214 | A1* | 5/2010 | Ahluwalia | 455/450 |
| 2011/0128865 | A1* | 6/2011 | Doppler et al. | 370/252 |
| 2013/0315122 | A1* | 11/2013 | Sirotkin et al. | 370/311 |
| 2014/0200016 | A1* | 7/2014 | Siomina et al. | 455/450 |
| 2014/0269397 | A1* | 9/2014 | Pelletier et al. | 370/252 |

OTHER PUBLICATIONS

Anonymous: "Measurement Gap and DRX Interaction", 3GPP DRAFT; R2-0734'13, 3$^{RD}$ Generation Partnership Project (3GPP), Mobile Competence Centre, Aug. 14, 2007, XP050136118, the whole document.
Anonymous: "Measurements in LTE E-UTRAN", LteWorld, Mar. 26, 2010, XP002694603, Retrieved from the Internet: URL:http://lteworld.org/blog/measurements-lte-e-utran [retrieved on Mar. 27, 2013] the whole document.

* cited by examiner

*Primary Examiner* — Ian N Moore
*Assistant Examiner* — Eric P Smith
(74) *Attorney, Agent, or Firm* — Meyertons, Hood, Kivlin, Kowert & Goetzel, P.C.

(57) ABSTRACT

Methods and apparatus for managing radio measurements during discontinuous reception. In one exemplary embodiment, the distribution of Long Term Evolution (LTE) DRX measurements is staggered or distributed across multiple DRX cycles (which may be contiguous or non-contiguous) so as to reduce the transceiver activity and power consumption. The exemplary UE in one implementation only performs a subset of measurements during each DRX cycle. By staggering or distributing cell measurements over multiple DRX cycles, the UE can improve power consumption, while still conforming to measurement requirements.

20 Claims, 5 Drawing Sheets

COLOR CODE

DRX DL CONTROL & TRAFFIC PROCESSING

NEIGHBOR MEASUREMENT FOR ONE CELL

METHODS AND APPARATUS FOR MANAGING RADIO MEASUREMENTS DURING DISCONTINUOUS RECEPTION

PRIORITY AND RELATED APPLICATIONS

The present application claims priority to U.S. Provisional Patent Application Ser. No. 61/585,209, filed Jan. 10, 2012, entitled "METHODS AND APPARATUS FOR MANAGING RADIO MEASUREMENTS DURING DISCONTINUOUS RECEPTION," and is related to U.S. Provisional Patent Application Ser. No. 61/585,207, entitled "METHODS AND APPARATUS FOR POWER CONSUMPTION MANAGEMENT DURING DISCONTINUOUS RECEPTION" filed on Jan. 10, 2012, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the invention is directed to methods and apparatus for managing radio measurements during discontinuous reception (DRX).

2. Description of the Related Art

Mobile wireless devices are becoming increasingly full-featured and complex, and accordingly must support multiple aspects of operation including for example voice calls, data streaming, and various multimedia applications. High speed data capability is particularly significant for mobile device users, and various technologies have recently been implemented to enhance mobile device capability in this regard. One exemplary high-bandwidth technology is the Long Term Evolution (LTE) cellular capability, which has become increasing pervasive on mobile wireless devices (also referred to as User Equipment, or "UEs").

While enhancing data capability, LTE networks also place additional demands on mobile wireless device power consumption. Accordingly, mechanisms exist within LTE-enabled devices to mitigate power consumption, and hence enhance user experience by not draining the user's battery at an undesirable rate. One such mechanism within LTE is known as discontinuous reception, or "DRX", and another is discontinuous transmission or "DTX". In LTE networks, the base station (Enhanced NodeB, or "eNB") controls DRX operations using various timers and/or parameters that are communicated to the UE.

LTE communications are further conducted according to a time schedule that includes frames, subframes, and slots. When the UE has a radio resource connection (RRC), the UE can be allocated one or more time slots for communication. If a UE is enabled for DRX operation in RRC connected mode, the UE will wake-up and sleep in accordance with its resource allocations. During RRC idle mode, the UE does not have a radio resource connection. The UE will periodically wake-up to see if it is being paged within a frame of data. If the frame does not have a page for the UE, the UE will go back to sleep.

Unfortunately, present implementations of the DRX functionality utilize a complete set of measurements (e.g., cell measurements) during each DRX cycle. However, a complete set of measurements on each cycle is not always required, and accordingly additional resources (including battery power) are expended in performing these unnecessarily complete measurements on each cycle.

Accordingly, improved methods and apparatus are needed to further refine and more intelligently schedule measurements during DRX cycle operation.

SUMMARY OF THE INVENTION

The present invention satisfies the aforementioned needs by providing, inter alia, improved apparatus and methods for managing radio measurements during discontinuous reception.

In a first aspect of the invention, a method for reducing energy consumption by a user equipment (UE) wireless communications device operating in discontinuous reception is disclosed. In one embodiment, the method includes: determining one or more radio measurements that must be performed within a plurality of discontinuous reception cycles, each of the one or more radio measurements having a minimum periodicity associated therewith; determining a schedule for performing the one or more radio measurements within the plurality of discontinuous reception cycles; and executing the one or more radio measurements according to the determined schedule.

In a second aspect of the invention a portable radio communications apparatus is disclosed. In one embodiment, the apparatus includes: a processor; a wireless interface; and power management logic in communication with the processor and the wireless interface and configured to reduce energy use associated with performance of a plurality of radio measurements under discontinuous reception by the apparatus. In one variant, the logic reduces energy use by at least: determining one or more radio measurements to be performed within a plurality of discontinuous reception cycles, individual ones of the one or more radio measurements having a minimum periodicity associated therewith; determining a schedule for performing the one or more radio measurements within the plurality of discontinuous reception cycles; and executing the one or more radio measurements according to the determined schedule. Executing the one or more radio measurements according to the determined schedule is configured in one variant to effectuate the reduced energy use.

In a third aspect of the invention, computer readable apparatus comprising a storage medium and having a plurality of computer readable instructions stored thereon is disclosed. In one embodiment, the instructions are configured to, when executed: determine one or more radio measurements to be performed within a plurality of discontinuous reception cycles, individual ones of the one or more radio measurements having a minimum periodicity associated therewith; distribute the one or more radio measurements over the plurality of discontinuous reception cycles based on one or more performance indicators (PI); and execute the one or more radio measurements according to the distribution. In one variant, the distribution of the one or more radio measurements over the plurality of discontinuous reception cycles includes: distribution of the one or more radio measurements over a first number of the plurality of discontinuous reception cycles based on the one or more PT meeting or exceeding a threshold; and distribution of the one or more radio measurements over a second number of the plurality of discontinuous reception cycles based on the one or more PT being less than the threshold, the second number being less than the first number.

In another embodiment, the computer readable instructions are configured to, when executed cause a mobile wireless device to: determine one or more radio measurements to be performed within a plurality of discontinuous reception cycles; schedule performance of the one or more radio measurements relative to the plurality of discontinuous reception cycles; and execute the one or more radio measurements according to the schedule. In one variant, execution of the one or more radio measurements according to the determined schedule effectuates an energy saving within the mobile device by at least reducing the number of measurements that would otherwise be made within a single one of the plurality of cycles.

In a fourth aspect of the invention, a method of operating a base station in a long term evolution (LTE) cellular wireless communications network is disclosed. In one embodiment, the method includes: configuring one or more mobile devices operable within the network to save energy associated with a plurality of discontinuous reception cycles, the configuration is causing the one or more mobile devices to: determine one or more radio measurements to be performed within individual ones of the plurality of discontinuous reception cycles; determine a schedule for performing the one or more radio measurements within the plurality of discontinuous reception cycles; and execute the one or more radio measurements according to the determined schedule.

In a fifth aspect of the invention, a wireless base station apparatus is disclosed, In one embodiment, the apparatus includes: at least one wireless cellular interface; and logic in data communication with the at least one interface and configured to manage radio measurements by one or more user equipment (UE) within a plurality of discontinuous reception cycles, by at least configuring the one or more UE for the plurality of discontinuous reception cycles. This configuration causes the one or more UE to: identify one or more radio measurements to be performed within individual ones of the plurality of discontinuous reception cycles; determine a schedule for performing the one or more radio measurements within the plurality of discontinuous reception cycles; and execute the one or more radio measurements according to the determined schedule. In one variant, the distribution of the one or more radio measurements over the plurality of discontinuous reception cycles comprises distribution of the one or more radio measurements over a number of the plurality of discontinuous reception cycles based on one or more performance indicators, the number being related at least in part on a relationship of the one or more performance indicators relative to one or more respective threshold values.

In a sixth aspect of the invention, an integrated circuit (IC) is disclosed. In one embodiment, the integrated circuit comprises logic which is configured to implement management of radio measurements within a plurality of discontinuous reception cycles so as to enhance power saving within, e.g., a mobile wireless device.

In a seventh aspect of the invention, a wireless system is disclosed. In one embodiment, the system includes a plurality of base stations and a plurality of mobile user devices. The mobile user devices are configured to implement management of radio measurements within a plurality of discontinuous reception cycles so as to enhance power saving.

Other features and advantages of the present invention will immediately be recognized by persons of ordinary skill in the art with reference to the attached drawings and detailed description of exemplary embodiments as given below.

Figure 1:
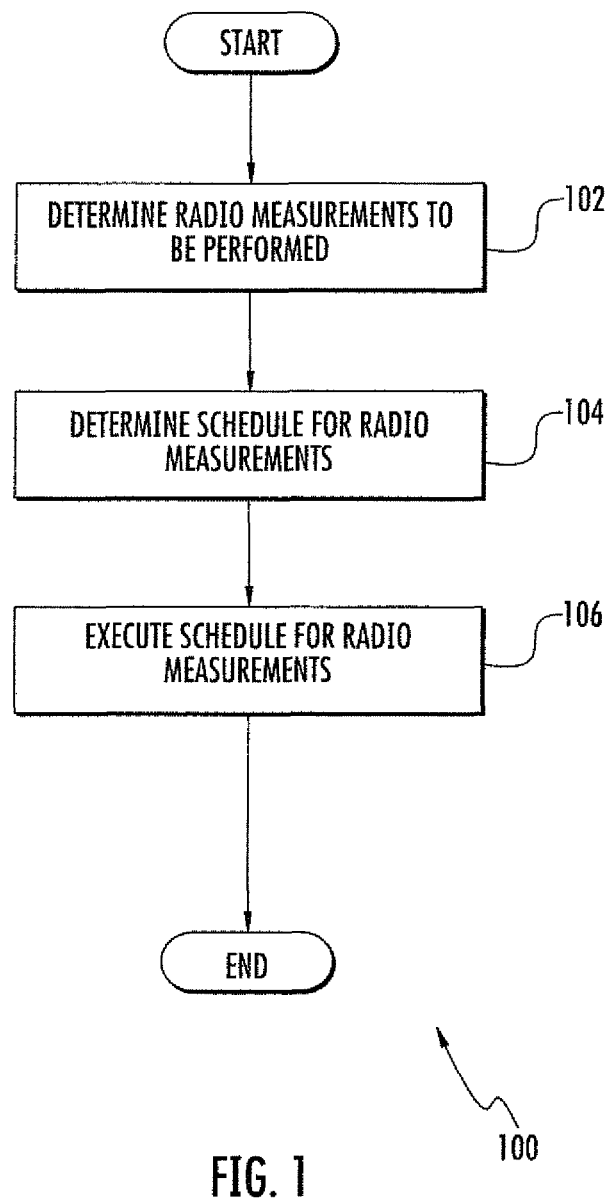
FIG. 1 is a logical flow diagram depicting one embodiment of a generalized method for managing radio measurements during discontinuous reception in accordance with various aspects of the present invention.

All Figures © Copyright 2012 Apple Inc. All rights reserved.

DETAILED DESCRIPTION OF THE INVENTION

Reference is now made to the drawings, wherein like numerals refer to like parts throughout.

Exemplary embodiments of the present invention are now described in detail. While these embodiments are primarily discussed in the context of cellular networks including without limitation, third generation (3G) Universal Mobile Telecommunications System (UMTS) wireless networks, Long Term Evolution (LTE) wireless networks and other fourth generation (4G) or LTE-Advanced (LTE-A) wireless networks, it will be recognized by those of ordinary skill that the present invention is not so limited. In fact, the various aspects of the invention are useful in and readily adapted to any wireless network that can benefit from the adaptive or scheduled wake-up procedures described herein.

Overview—

In one aspect of the invention, a user equipment (UE) device is disclosed which is configured to "stagger" or distribute the distribution of DRX measurements across multiple DRX cycles (which may be contiguous or non-contiguous) so as to, inter alia, reduce the transceiver activity and power consumption during each individual DRX cycle. Unlike prior art solutions, the UE of the exemplary embodiment only performs a subset of measurements during each DRX cycle. By staggering cell measurements over multiple DRX cycles, the UE can improve power consumption, while still conforming to measurement requirements.

As described in greater detail herein, the staggered/distributed measurements may also be handled differently in different conditions. Various schemes are disclosed for staggering or distributing measurements based on a multitude of considerations including without limitation: (i) the type of measurement, (ii) network conditions, (iii) user preferences, (iv) network preferences, (v) application preferences, (vi) network capabilities, (vii) device capabilities, (viii) measurement utility, and (ix) device mode.

In another aspect of the invention, a UE distributes measurements across multiple DRX cycles based on physical layer (PHY) key performance indicators (KPI). Common examples of KPI include for example, signal to noise ratio (SNR) for synchronization signals (which is determined during initial searching), frequency error, power control states, etc. For example, at low SNR values, the UE has an increased probability of misinterpreting a neighbor cell (i.e., mistakenly identifying a neighbor cell); whereas at high SNR values, the UE can reliably and accurately perform cell measurements.

Furthermore, in yet another aspect of the invention, a high power/low power capable UE staggers cell measurements in accordance with the power modes of the UE. For example, if the reception conditions are good, more neighbor measurements can be done during the DRX cycles using low power mode. Conversely, if the reception is poor, the neighbor cell measurements need to be in high power mode to ensure that the neighbor cell measurements are accurate.

Methods—

FIG. 1 illustrates one embodiment of a generalized method 100 for managing radio measurements during discontinuous reception according to the invention. In one exemplary aspect, a user equipment (UE) device staggers or otherwise distributes radio measurements over multiple discontinuous or non-contiguous reception (DRX) cycles. Specifically, user equipment (UE) or other device can intelligently perform a greater or fewer number of radio measurements during a DRX cycle or group of cycles, so as to reduce the average number of measurements performed, and also to reduce the overall device power consumption.

At step 102 of the method 100, a user equipment (UE) determines one or more radio measurements that can be performed, and a staggered periodicity or other distribution scheme for each. In one exemplary embodiment, a Long Term Evolution (LTE) cellular network specifies a minimum periodicity for cell measurement information. The minimum periodicity ensures that the UE and network can make reasonable decisions as to mobility management (e.g., when to perform cell re-selection, and/or handover to another base station).

In one embodiment, the UE identifies one or more measurements which have a minimum periodicity that is greater than the DRX cycle periodicity (i.e., the minimum periodicity requirement of the network for the measurement can be satisfied without performing the measurement at each DRX cycle). For each identified measurement, the UE determines a staggered periodicity. The staggered periodicity can be based on multiple factors including for example: the type of measurement, network conditions, user preferences, network preferences, application preferences, network capabilities, device capabilities, measurement utility, device mode, etc.

As described in greater detail hereinafter, a staggered periodicity may be shortened to increase measurement granularity, or alternately lengthened to reduce power consumption.

At step 104 of the method 100, the UE determines a schedule for performing the one or more radio measurements across multiple DRX according to the staggered periodicities. In one exemplary embodiment, the UE schedules the staggered periodicities so as to maximally distribute the measurements over a time interval. For example, the UE may distribute the measurements over a number of DRX cycles, such that each DRX cycle has an equal (or nearly equal) number of measurements (i.e., if the number of measurements is not cleanly divisible into the number of DRX cycles, then a few of the DRX cycles may be only slightly more heavily loaded than the other).

Where the measurements do not take the same amount of time or other parameters (e.g., require more or less power, time, processing burden, etc.), the schedule may be adjusted to compensate for such discrepancies. For example, inter-frequency and intra-frequency cellular measurements have different overhead costs (i.e., inter-frequency measurements require additional search time, etc.), thus the schedule may look to evenly spread (to the extent reasonable) the overhead costs over each of the DRX cycles.

In an alternate embodiment, the UE may distribute measurements across multiple DRX cycles based on network conditions. For example, in one exemplary embodiment, the network conditions are physical layer (PHY) key performance indicators (KPI). Common examples of KPI include for example, signal to noise ratio (SNR) for synchronization signals (which is determined during initial searching), frequency error, power control states, etc. During periods of high reception quality, the UE may opt to perform a greater number of measurements, whereas during periods of low reception quality the UE may opt to forego measurements, rather than consume power for measurements of dubious quality.

In still other embodiments, the UE may distribute measurements across multiple DRX cycles based on UE specific operation. For example, for a UE that has a high power and a low power capability, the UE may leverage its power modes to maximize the most benefit of measurements. In one example scenario, during low power capability the UE reduces its cell measurements, whereas during high power capability the UE increases its number of cell measurements.

Still other variations will be readily appreciated by those of ordinary skill in the related arts, given the contents of the present disclosure.

At step 106 of the method 100, the UE executes the one or more radio measurements according to the determined schedule.

Power Consumption and Management in Cellular Networks—

In the following discussion, a cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected to a Core Network, which includes additional controllers for resource management and in some cases access to other network systems (such as the Internet, other cellular networks, etc.).

Figure 2:
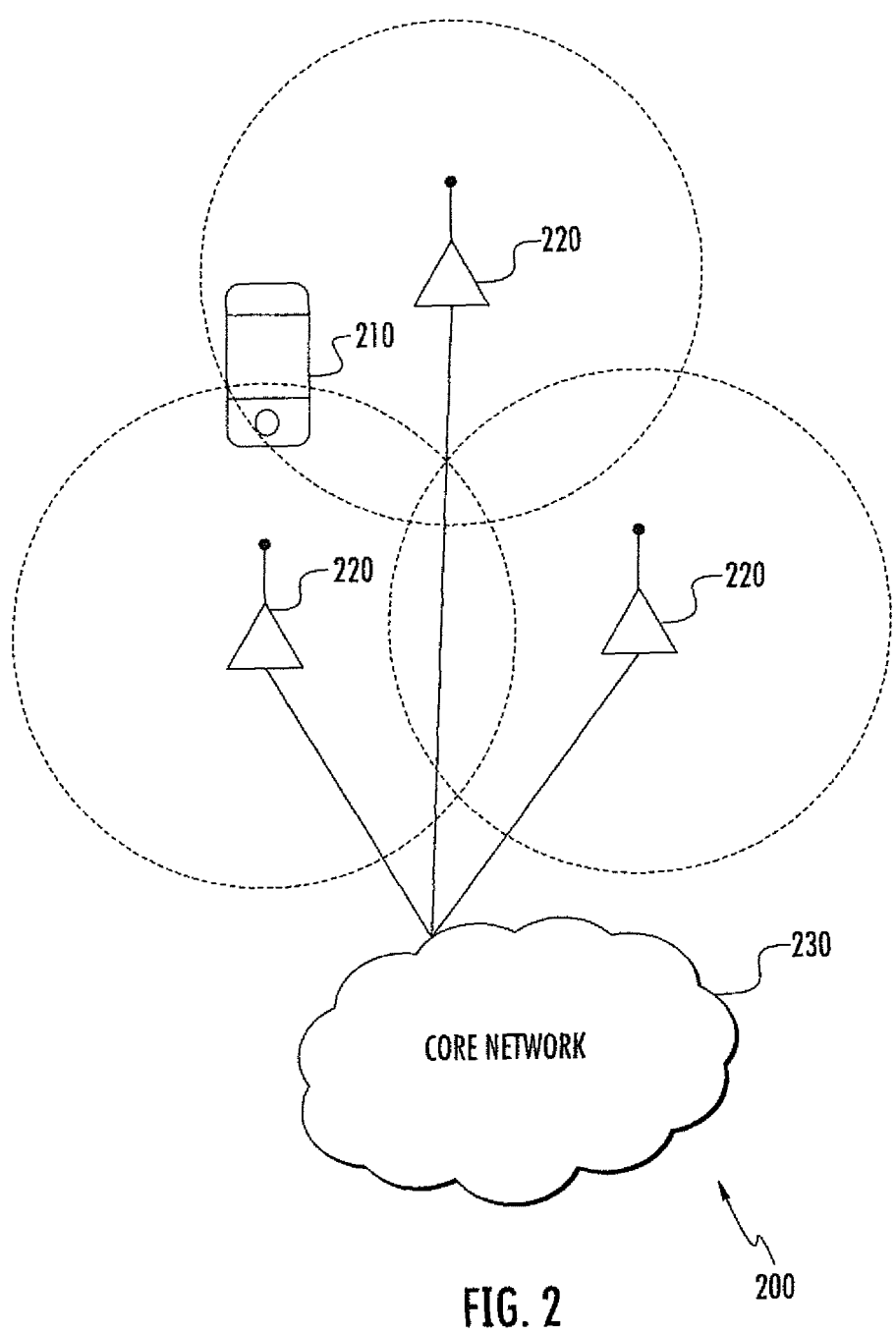
FIG. 2 is a graphical representation of one exemplary Long Term Evolution (LTE) cellular network useful with the present invention.

FIG. 2 illustrates one exemplary Long Term Evolution (LTE) cellular network 200, with user equipment (UEs) 210, operating within the coverage of the Radio Access Network (RAN) provided by a number of base stations (BSs) 220. The LTE base stations are commonly referred to as "Enhanced NodeBs" (eNBs). The Radio Access Network (RAN) is the collective body of eNBs along with the Radio Network Controllers (RNC). The user interfaces to the RAN via the UE, which in many typical usage cases is a cellular phone or smartphone. However, as used herein, the terms "UE", "client device", and "user device" may include, but are not limited to, cellular telephones, smartphones (such as for example an iPhone™ manufactured by the Assignee hereof), personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), such as for example an iPod™, or any combinations of the foregoing.

Each of the eNBs 220 are directly coupled to the Core Network 230 e.g., via broadband access. Additionally, in some networks the eNBs may coordinate with one another, via secondary access. The Core Network provides both routing and service capabilities. For example, a first UE connected to a first eNB can communicate with a second UE connected to a second eNB, via routing through the Core Network. Similarly, a UE can access other types of services e.g., the Internet, via the Core Network.

In order to reduce power consumption and improve the battery life of wireless user equipment (UE), certain wireless technologies implement so-called "discontinuous reception" (DRX) and "discontinuous transmission" (DTX). During DRX and DTX operation, the UE powers down most of the radio transceiver circuitry when there are no packets to be received or transmitted. The powered down components (in DRX OFF state) ("sleep mode") are powered up to the DRX ON state ("wake-up", "warm-up") at designated time intervals to e.g., receive data from the network ("listening"). DRX and DTX greatly improves device standby time, and can also provide significant reductions in power consumption during low use scenarios.

During DRX, the UE monitors for control and traffic packets of interest, and also performs measurement of neighboring cells. Neighboring cell measurements are important for cell re-selection and handover decisions. Neighbor cell measurements are used by the network to optimize mobility management in wireless networks using the same wireless technology, or for handovers to different wireless technologies. For example, one common measurement is the received signal power (both pilot signals and data signals) of neighboring cells. When the neighboring cell received signal power is equivalent or exceeds the current serving cell, the device or network may trigger a handover or cell re-selection.

Within existing solutions, the UE performs its radio measurements each time the UE powers on in its DRX cycle. Unfortunately, the radio transceiver consumes a significant amount of power during neighbor cell measurements. This additional radio transceiver activity reduces the power savings of DRX operation that would otherwise be achievable. Accordingly, improved schemes for managing radio measurements during discontinuous reception are needed.

Exemplary Staggered Radio Measurements—

In one exemplary aspect of the present invention, a user equipment (UE) device staggers the distribution of DRX measurements across multiple DRX cycles to reduce the transceiver activity and power consumption during each individual DRX cycle. Staggering neighbor cell measurements improves overall power consumption by reducing the length of time that the user equipment remains in the DRX ON state. Specifically, rather than performing all cell measurements at each DRX ON state, the UE only performs a subset of the measurements. During each DRX cycle, the UE measures a different subset of measurements, such that the cumulative measurements encompass all DRX measurements required by the network.

Furthermore, as described in greater detail herein, the staggered measurements may also be handled differently in different conditions. For example, measurements may be staggered differently when the UE operates in different DRX operating modes (e.g., low-power DRX mode and high-power DRX mode). Similarly, measurements may be staggered differently based on physical layer (PHY) key performance indicators (KPI) such as: signal to noise ratios (SNR) of synchronization signals, frequency errors, or gain control state for neighbor cells, etc.

Before addressing the specifics of staggered operation, brief discussions of discontinuous reception (DRX), and cell measurements are provided.

Discontinuous Reception—

Figure 3:
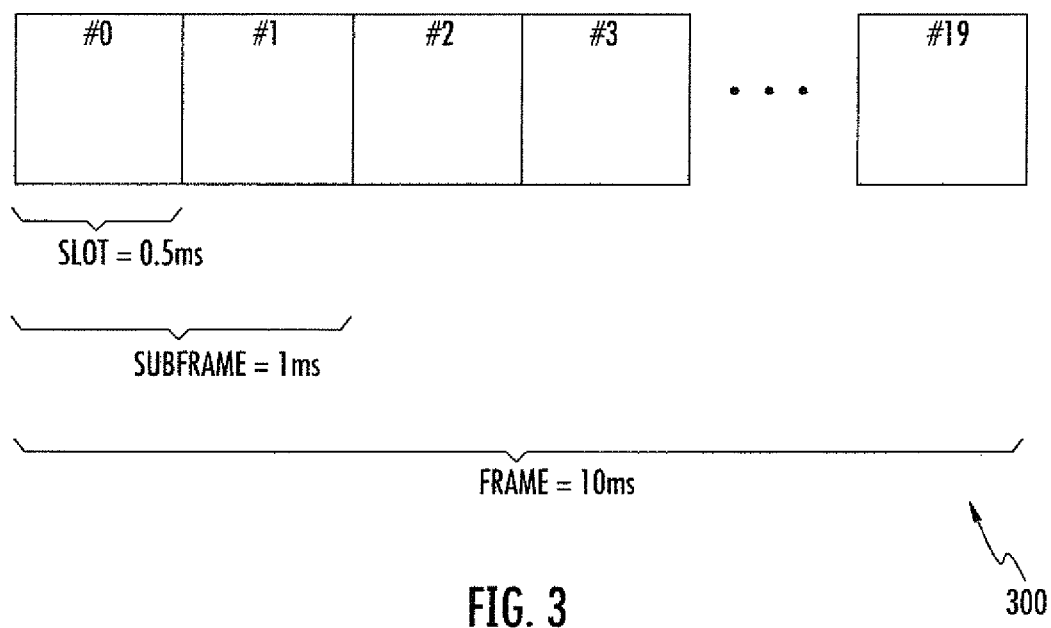
FIG. 3 is a graphical representation of one exemplary LTE frame useful with the present invention.

Within the context of Long Term Evolution (LTE) cellular networks, the Enhanced NodeB (eNB) controls DRX operations using various timers and/or parameters that are communicated to the user equipment (UE). As a brief aside, LTE communications are conducted according to a time schedule that includes frames, subframes, and slots. One such exemplary LTE frame 300 is illustrated in FIG. 3.

When the UE has a radio resource connection, the UE can be allocated one or more time slots for communication. If a UE is enabled for DRX operation in RRC connected mode, the UE will wake-up and sleep in accordance with its resource allocations. During RRC idle mode, the UE does not have a radio resource connection. The UE will periodically wake-up to see if it is being paged within a frame of data. If the frame does not have a page for the UE, the UE will go back to sleep.

In connected mode DRX (DRX performed during the RRC_CONNECTED state), a DRX inactivity timer indicates the time in number of consecutive subframes to wait before enabling DRX. Additionally, DRX operation is split into short cycles and long cycles. Short DRX cycles and long DRX cycles allow the eNB to adjust the DRX cycles based on ongoing application activity. For example, a UE may initially be placed in a short DRX cycle during brief lulls in activity. A DRX short cycle timer determines when to transition to the long DRX cycle; i.e., if the DRX short cycle timer expires without any UE activity, the UE transitions to the long DRX cycle which further reduces power consumption.

If no new packets are transmitted for an extended period of time after successfully receiving a packet (unsuccessful packet reception indicates a fading/broken connection which is handled with recovery/reconnection procedures), the eNB may release the RRC connection. Once the UE transitions into RRC IDLE state, idle mode DRX is enabled.

In idle mode DRX (DRX performed during the RRC_IDLE state), an ON duration timer determines the number of frames (each frame lasts 10 ms) the UE can sleep through before reading the downlink (DL) control channel. Commonly used values for the ON duration timer are 1, 2, 3, 4, 5, 6, 8, 10, 20, 30, 40, 50, 60, 80, 100, and 200. During idle mode DRX, the UE only needs to monitor one paging occasion (PO) per DRX cycle, which is one subframe. It is of particular note, that the DRX ON duration is distinct from cellular measurement requirements. In other words, changing a DRX ON duration does not affect the required periodicity for cell measurements (as described hereinafter).

Cell Measurements—

During each DRX cycle, the UE can also perform radio cell measurements. The radio cell measurements are reported by the UE to the radio access network (RAN); the RAN uses measurement data for mobility capabilities (e.g., cell re-selection, and handovers). Accurate measurement data ensures that the UE is continuously being serviced by the optimal cell. There are four (4) typical cell measurements: serving cell measurements, intra-frequency cell measurement, inter-frequency cell measurement, and inter-RAT cell measurements.

Serving cell measurements measure the signal strength of the serving cell that the UE is camped on. Serving cell measurements are generally measured more often and used in comparisons with other measurements as a baseline.

Intra-frequency cell measurements are performed on neighbor cells that are within the same frequency as the serving cell. The UE can initiate measurements of intra-frequency neighbor cells when the serving cell's received reference signal power (RSRP) or received signal quality (RSRQ) falls below pre-determined thresholds. Because intra-frequency cell measurements occur in the same frequency as the serving cell, the radio transceiver does not need to be tuned to a different frequency.

Inter-frequency cell measurements are performed in frequencies that differ from the UE's serving cell. For this reason, UEs must tune away from the serving cell to perform inter-frequency cell measurements. In addition, inter-frequency cell measurements may also be performed where timing is not synchronized for inter-frequency cells; this may require some "overhead" time for the UE to search the inter-frequency cell to synchronize timing, and then measure the received signal power and quality.

Inter-RAT cell measurements are performed between different radio access technologies (e.g., between Global Standard for Mobile Communications (GSM), Universal Mobile Telecommunications System (UMTS), and Long Term Evolution (LTE), Code Division Multiple Access (CDMA) 2000, etc.). Within the context of LTE, if the quality of the serving cell is above a certain threshold (e.g., $S_{NonIntraSearch}$ in LTE), the UE only searches for higher priority inter-RAT frequency layers. However, if the serving cell quality is less than the threshold ($S_{NonIntraSearch}$), then the UE searches and measures all inter-RAT cells. Inter-RAT measurements are the most complex measurements; inter-RAT measurements require a radio frequency search and a baseband cell-search. Thus, the overhead for an inter-RAT cell measurement is generally higher than the overhead time of either intra-frequency measurements, or inter-frequency measurements.

Example Operation—

In one exemplary embodiment of the present invention, a user equipment (UE) device staggers its discontinuous reception (DRX) measurements for power saving. Specifically, the UE adaptively distributes one or more measurements into multiple DRX cycles so as to both satisfy the measurement requirements and also distribute the measurement cost (e.g., measurement time and overhead) for each individual DRX cycle.

Consider a UE that must perform a number of neighbor cell measurements during its DRX cycles. The UE has a minimum periodicity threshold that requires that all measurements are made at least once within a time period (e.g., 1.28 seconds), where the time period spans multiple DRX cycles (e.g., a DRX cycle having an ON duration timer stipulates wake-up for 10 ms and sleep for 30 ms, with a periodicity of 40 ms). Within this context, the UE can perform cell measurements more frequently to get better measurement granularity, and/or assign a DRX measurement to a specific DRX cycle.

Three exemplary use case scenarios are presented that are illustrative of various aspects of the present invention.

First Scenario—

Figure 4:
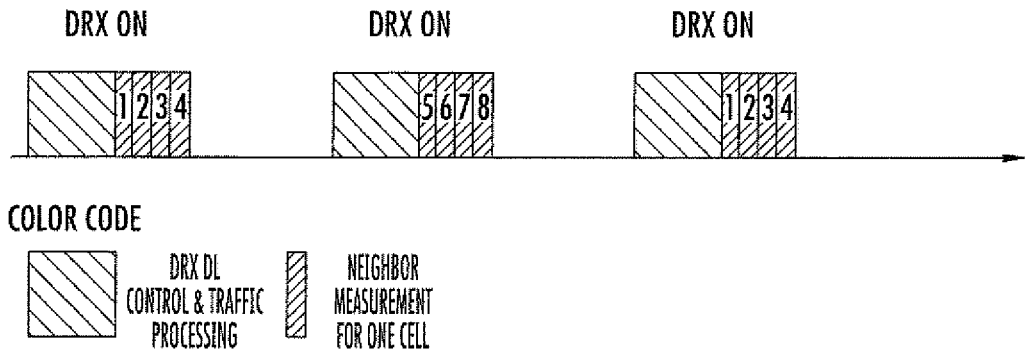
FIG. 4 is a graphical representation of one scenario for distributing measurements across multiple DRX cycles in accordance with the present invention.

Referring now to FIG. 4, one scenario for distributing measurements across multiple DRX cycles is depicted. As shown, eight (8) intra-frequency measurements are distributed over two (2) DRX cycles which reduce the power consumption of each individual DRX cycle. While intra-frequency measurements are shown (which do not require any additional overhead for cell search and RF tuning), it is appreciated that other measurements (and their associated overhead timing costs) may be readily substituted by one of ordinary skill in the related arts, given the contents of the present disclosure.

Second Scenario—

Figure 5:
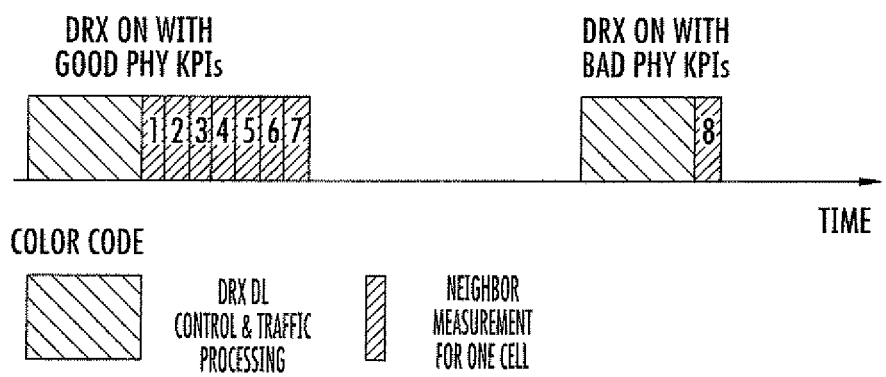
FIG. 5 is a graphical representation of a second scenario for distributing measurements across multiple DRX cycles in accordance with the present invention.

FIG. 5 depicts a second scenario for distributing measurements across multiple DRX cycles. Unlike the scenario of FIG. 4, FIG. 5 distributes measurements based on physical layer (PHY) key performance indicators (KPI). As a brief aside, the PHY is a low level software abstraction layer that handles the interface to the physical medium (i.e., the air interface). Examples of PHY layer interactions include for example, modulation and coding schemes, power control, etc. Common examples of KPI include for example, signal to noise ratio (SNR) for synchronization signals (which is determined during initial searching), frequency error, power control states, etc.

At low SNR values, the UE has an increased probability of misinterpreting a neighbor cell (i.e., mistakenly identifying a neighbor cell); at high SNR values, the UE can reliably and accurately perform cell measurements. As shown in FIG. 5, the number of neighbor cell measurements is adaptively scheduled for DRX cycles according to the overall signal quality (e.g., the quality of the KPIs).

In some embodiments the UE may include an optimization engine, dynamically determining the optimal distribution of measurements to DRX cycles. Such embodiments may optimize the DRX cycle for making cell measurements based on e.g., type of measurement, network conditions, user preferences, network preferences, application preferences, network capabilities, device capabilities, measurement utility, device mode, etc.

In alternate embodiments, the UE may store a pre-determined mapping table to simplify distribution of measurements to DRX cycles. While a mapping table may not provide a perfectly optimized assignment of measurements to DRX cycles, mapping tables can be simply implemented within memory and do not add any substantial processing burden. For example, one such mapping table may receive the number and type of measurement operation, and based on KPI index values, map the measurements to a number of DRX cycles.

Third Scenario—

In still another variant, a UE may include multiple power modes that consume different levels of power with different processing capabilities. In one such embodiment, the UE can operate in two power modes during DRX cycles: a high power mode, and a low power mode.

In the UE's high power mode the UE powers all the circuitry including the RF, analog components, baseband, clocks and processors, etc. In high power mode, the UE can perform signal processing for all the receiver algorithms, thus the UE consumes more power but has improved receiver capabilities and better measurement accuracy for neighbor cell measurements In contrast, the UE's low power mode only enables transceiver circuitry for a short amount time to receive data for baseband processing. After the received data is captured and stored in sample buffers, the RF and analog parts are turned off and the receiving algorithms will be applied onto the captured samples in an offline mode. In low power mode, there is less power consumption, however receiver algorithms can only be applied to a limited number of data, thus the results of the modulation and decoding of the received signals is less reliable compared to the high power mode.

Within the context of a high power/low power capable UE, cell measurements during DRX cycles can additionally be staggered in accordance with the power modes of the UE. For example, if the physical layer (PHY) key performance indicators (KPIs) are good, more neighbor measurements can be done during the DRX cycles using low power mode so as to maximize power savings with good DL reception. Conversely, if the PHY KPIs are bad, the neighbor measurements need to be in high power mode to ensure that the neighbor measurements are accurate.

User Apparatus—

Figure 6:
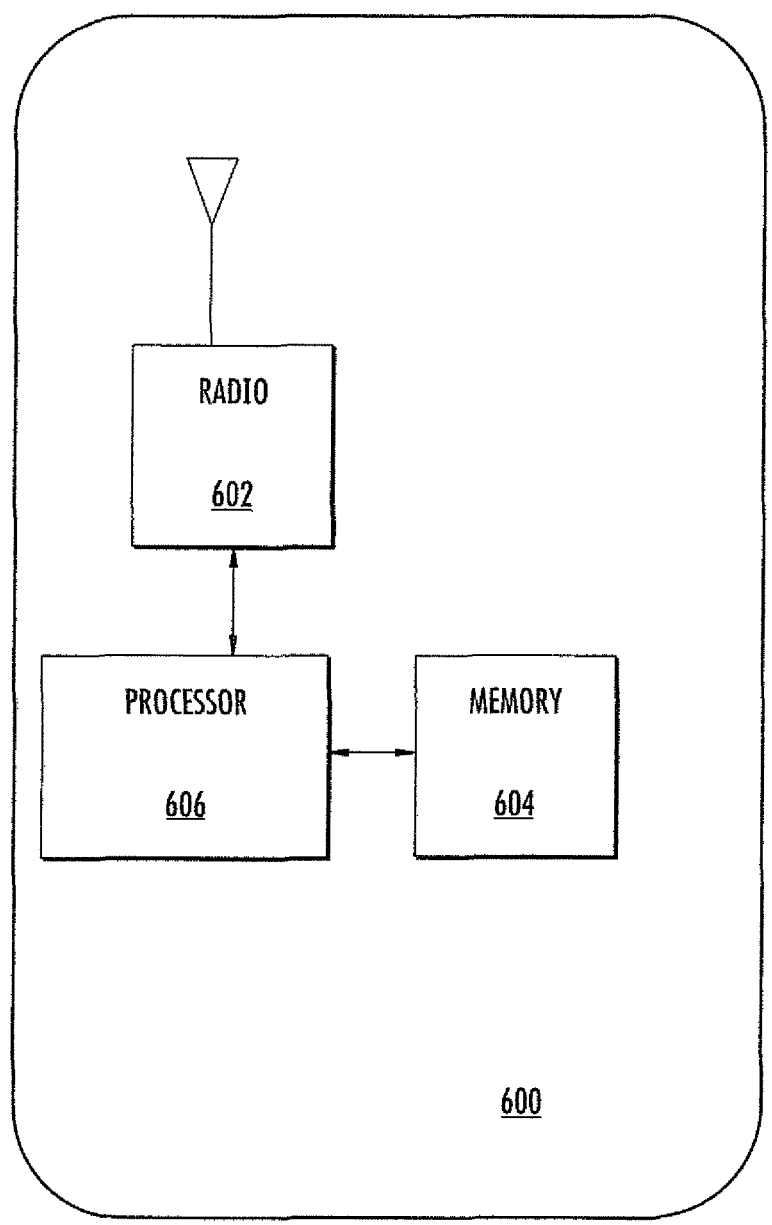
FIG. 6 illustrates an apparatus in accordance with the present invention.

Referring now to FIG. 6, an exemplary user device apparatus 600 for managing radio measurements during discontinuous reception is illustrated. While one specific device configuration and layout is shown and discussed herein, it is recognized that many other configurations may be readily implemented by one of ordinary skill given the present disclosure, the apparatus 600 of FIG. 6 being merely illustrative of the broader principles of the invention.

The apparatus 600 of FIG. 6 includes one or more radio transceivers 602, a computer readable memory 604, and a processing subsystem 606.

The processing subsystem 606 includes one or more of central processing units (CPU) or digital processors, such as a microprocessor, digital signal processor, field-programmable gate array, RISC core, or plurality of processing components mounted on one or more substrates. The processing subsystem is coupled to computer readable memory 604, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also comprise additional co-processors, such as a dedicated graphics accelerator, network processor (NP), or audio/video processor. As shown processing subsystem 606 includes discrete components; however, it is understood that in some embodiments they may be consolidated or fashioned in a SoC (system-on-chip) configuration.

The processing subsystem 606 is adapted to receive one or more data streams from a radio transceiver 602. The radio transceiver in this exemplary embodiment generally comprises a cellular radio transceiver configured to perform radio measurements during discontinuous reception. In one embodiment, the radio measurements are performed so as to minimize measurement loading during each DRX cycle. The radio measurements are performed for example according to a schedule determined based on one or more physical layer (PHY) key performance indicators (KPI). In another embodiment, the radio measurements are performed according to a schedule determined based on device operation mode.

In one configuration, the foregoing scheduling logic for the DRX cycles is implemented in the storage device 604 as a computer program that "intelligently" manages and schedules cell measurements, although it will be appreciated that the scheduling functionality may be implemented in hardware (logic) or firmware, or as combinations of the foregoing.

Moreover, myriad other schemes and combinations of scheduling logic for distributing measurements over a plurality of DRX cycles will be recognized by those of ordinary skill, given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for operating a user equipment (UE) device, the method comprising:
    determining one or more radio measurements to be performed within a plurality of discontinuous reception cycles, individual ones of the one or more radio measurements having a minimum periodicity associated therewith;
    determining a schedule for performing the one or more radio measurements within the plurality of discontinuous reception cycles; and
    executing the one or more radio measurements according to the determined schedule wherein:
        the one or more radio measurements are distributed over the plurality of discontinuous reception cycles,
        individual ones of the one or more radio measurements comprise a partial measurement, the partial measurement characterized by a reduced energy consumed by the UE device compared to a complete radio measurement,
        the performance of the one or more radio measurements provides measurement data achievable with the complete radio measurement, and
        the executing the one or more radio measurements according to the determined schedule reduces energy consumed by the UE device while obtaining the measurement data.

2. The method of claim 1, wherein the one or more radio measurements are distributed over the plurality of discontinuous reception cycles based at least in part on one or more performance indicators (PI).

3. The method of claim 2, wherein:
    the UE device is operable in a high transmit power (HP) and a low transmit power (LP) mode, the HP mode characterized by power consumption being higher compared to the LP mode; and
    the distributing the one or more radio measurements based on one or more performance indicators comprises:
    when PI is above a threshold, a scheduling a plurality of successive of the one or more radio measurements in the LP mode; and
    when PI is below the threshold, a scheduling the plurality of successive of the one or more radio measurements in the HP mode.

4. The method of claim 3, wherein the PI comprises one or more of (i) signal to noise ratio (SNR) for a synchronization signal; (ii) a frequency error; and (iii) power control state assigned by a base station to the UE.

5. The method of claim 2, wherein distributing the one or more radio measurements over the plurality of discontinuous reception cycles comprises:
    distributing the one or more radio measurements over a first number of the plurality of discontinuous reception cycles based on the PI exceeding a threshold;
    distributing the one or more radio measurements over a second number of the plurality of discontinuous reception cycles based on the PI being below the threshold; and
    wherein the first number is greater than the second number.

6. The method of claim 1, wherein the one or more radio measurements comprises one or more of: serving cell measurements, intra-frequency cell measurements, inter-frequency cell measurements, and inter-radio access technology (inter-RAT) cell measurements.

7. The method of claim 1, wherein the one or more radio measurements are evenly distributed over the plurality of discontinuous reception cycles.

8. The method of claim 7, wherein the one or more radio measurements are evenly distributed over the plurality of discontinuous reception cycles based on an operational mode of the UE.

9. The method of claim 1, wherein the method for operating reduces power consumption by the UE, associated with determining the one or more radio measurements.

10. A portable radio communications apparatus comprising:
   a processor;
   a wireless interface; and
   power management logic in communication with the processor and the wireless interface and configured to reduce energy use associated with performance of a plurality of radio measurements under discontinuous reception by the apparatus, by at least:
      determining one or more radio measurements to be performed within a plurality of discontinuous reception cycles, individual ones of the one or more radio measurements having a minimum periodicity associated therewith;
      determining a schedule for performing the one or more radio measurements within the plurality of discontinuous reception cycles; and
      executing the one or more radio measurements according to the determined schedule;
   wherein:
      the one or more radio measurements are distributed over the plurality of discontinuous reception cycles,
      individual ones of the one or more radio measurements comprise a partial measurement, the partial measurement characterized by a reduced energy consumed by the portable radio communications apparatus compared to a complete radio measurement,
      the performance of the one or more radio measurements provides measurement data achievable with the complete radio measurement, and
      the executing the one or more radio measurements according to the determined schedule is configured to effectuate the reduced energy use.

11. A computer readable apparatus comprising a storage medium and having a plurality of computer readable instructions stored thereon, the instructions configured to, when executed by a user equipment device (UE):
   determine one or more radio measurements to be performed within a plurality of discontinuous reception cycles, individual ones of the one or more radio measurements having a minimum periodicity associated therewith;
   distribute the one or more radio measurements over the plurality of discontinuous reception cycles based on one or more performance indicators (PI); and
   execute the one or more radio measurements according to the distribution;
   wherein the distribution of the one or more radio measurements over the plurality of discontinuous reception cycles comprises:
      distribution of the one or more radio measurements over a first number of the plurality of discontinuous reception cycles based on the one or more PI meeting or exceeding a threshold; and
      distribution of the one or more radio measurements over a second number of the plurality of discontinuous reception cycles based on the one or more PI being less than the threshold, the second number being less than the first number;
   wherein:
      individual ones of the one or more radio measurements comprise a partial measurement, the partial measurement characterized by a reduced energy consumed by the UE compared to a complete radio measurement,
      the performance of the one or more radio measurements provides measurement data achievable with the complete radio measurement, and
      the executing the one or more radio measurements according to the determined schedule reduces energy consumed by the UE while obtaining the measurement data.

12. A method of operating a base station in a long term evolution (LTE) cellular wireless communications network, the method comprising:
   configuring one or more mobile devices operable within the network to save energy associated with a plurality of discontinuous reception cycles, the configuration is causing the one or more mobile devices to:
      determine one or more radio measurements to be performed within individual ones of the plurality of discontinuous reception cycles;
      determine a schedule for performing the one or more radio measurements within the plurality of discontinuous reception cycles; and
      execute the one or more radio measurements according to the determined schedule;
   wherein:
      the one or more radio measurements are distributed over the plurality of discontinuous reception cycles,
      individual ones of the one or more radio measurements comprise a partial measurement, the partial measurement characterized by a reduced energy consumed by the respective mobile device compared to a complete radio measurement,
      the performance of the one or more radio measurements provides measurement data achievable with the complete radio measurement, and
      the executing the one or more radio measurements according to the determined schedule reduces energy consumed by the respective mobile device while obtaining the measurement data.

13. The method of claim 12, wherein:
   the base station comprises a serving base station associated with the serving cell; and
   the execution of the one or more radio measurements comprises performing one or more of: (i) serving cell measurements, (ii) intra-frequency cell measurements, (iii) inter-frequency cell measurements, and (iv) inter-radio access technology (inter-RAT) cell measurements.

14. The method of claim 12, wherein the one or more radio measurements are distributed over the plurality of discontinuous reception cycles based on one or more key performance indicators (KPI).

15. The method of claim 14, wherein, the distribution comprises:
   distributing the one or more radio measurements over a first number of the plurality of discontinuous reception cycles based on the one or more KPI exceeding a threshold; or distributing the one or more radio measurements over a second number of the plurality of discontinuous reception cycles based on the one or more KPI being less than the threshold, the first number being greater than the second number.

16. The method of claim 15, wherein the one or more KPI comprises one or more of: (i) a signal to noise ratio (SNR) for a synchronization signal; (ii) a frequency error; and (iii) a power control state assigned by the base station to the one or more mobile devices.

17. The method of claim 12, wherein the one or more radio measurements are evenly distributed over the plurality of discontinuous reception cycles.

18. The method of claim 12, further comprising configuring an operational mode for the one or more mobile devices; wherein the one or more radio measurements are evenly distributed over the plurality of discontinuous reception cycles based on the operational mode.

19. A wireless base station apparatus comprising:
at least one wireless cellular interface; and
logic in data communication with the at least one interface and configured to manage radio measurements by one or more user equipment (UE) within a plurality of discontinuous reception cycles, by at least configuring the one or more UE for the plurality of discontinuous reception cycles, thereby causing the one or more UE to:
  identify one or more radio measurements to be performed within individual ones of the plurality of discontinuous reception cycles;
  determine a schedule for performing distributing the one or more radio measurements within over the plurality of discontinuous reception cycles; and
  execute the one or more radio measurements according to the determined schedule;
wherein:
  the distribution of the one or more radio measurements over the plurality of discontinuous reception cycles comprises distribution of the one or more radio measurements over a number of the plurality of discontinuous reception cycles and is based on one or more performance indicators, the number being related at least in part on a relationship of the one or more performance indicators relative to one or more respective threshold values,
  individual ones of the one or more radio measurements comprise a partial measurement, the partial measurement characterized by a reduced energy consumed by the respective UE compared to a complete radio measurement,
  the performance of the one or more radio measurements provides measurement data achievable with the complete radio measurement, and
  the executing the one or more radio measurements according to the determined schedule reduces energy consumed by the respective UE while obtaining the measurement data.

20. A computer readable apparatus storing a plurality of computer readable instructions configured to, when executed cause a mobile wireless device to:
determine one or more radio measurements to be performed within a plurality of discontinuous reception cycles;
schedule performance of the one or more radio measurements relative to the plurality of discontinuous reception cycles; and
execute the one or more radio measurements according to the schedule;
wherein execution of the one or more radio measurements according to the determined schedule effectuates an energy saving within the mobile device by at least reducing the number of measurements that would otherwise be made within a single one of the plurality of cycles, wherein:
  the one or more radio measurements are distributed over the plurality of discontinuous reception cycles,
  individual ones of the one or more radio measurements comprise a partial measurement, the partial measurement characterized by a reduced energy consumed by the mobile wireless device compared to a complete radio measurement,
  the performance of the one or more radio measurements provides measurement data achievable with the complete radio measurement, and
  the executing the one or more radio measurements according to the determined schedule reduces energy consumed by the mobile wireless device while obtaining the measurement data.

* * * * *